(12) United States Patent
Wang et al.

(10) Patent No.: US 12,158,341 B2
(45) Date of Patent: Dec. 3, 2024

(54) REAL-TIME ABNORMITY-DIAGNOSING AND INTERPOLATION METHOD FOR WATER REGIME-MONITORING DATA

(71) Applicants: CHINA THREE GORGES CORPORATION, Beijing (CN); CHINA INSTITUTE OF WATER RESOURCES AND HYDROPOWER RESEARCH, Beijing (CN)

(72) Inventors: Hao Wang, Beijing (CN); Xiaohui Lei, Beijing (CN); Huichao Dai, Beijing (CN); Zhao Zhang, Beijing (CN); Chao Wang, Beijing (CN); Heng Yang, Beijing (CN); Yongnan Zhu, Beijing (CN); Zhaohui Yang, Beijing (CN)

(73) Assignees: CHINA THREE GORGES CORPORATION (CN); CHINA INSTITUTE OF WATER RESOURCES AND HYDROPOWER RESEARCH (CN)

( * ) Notice: Subject to any disclaimer, the term of this patent is extended or adjusted under 35 U.S.C. 154(b) by 129 days.

(21) Appl. No.: 17/625,639

(22) PCT Filed: Mar. 10, 2021

(86) PCT No.: PCT/CN2021/080037
§ 371 (c)(1),
(2) Date: Jan. 7, 2022

(87) PCT Pub. No.: WO2021/197009
PCT Pub. Date: Oct. 7, 2021

(65) Prior Publication Data
US 2023/0015731 A1  Jan. 19, 2023

(30) Foreign Application Priority Data
Apr. 2, 2020  (CN) .......................... 202010256036.1

(51) Int. Cl.
*G01C 13/00* (2006.01)
(52) U.S. Cl.
CPC ..................................... *G01C 13/00* (2013.01)
(58) Field of Classification Search
CPC ....... G01C 13/00; G01C 13/008; G06N 3/084
See application file for complete search history.

(56) References Cited

U.S. PATENT DOCUMENTS

| | | | |
|---|---|---|---|
| 8,229,880 B2* | 7/2012 | Boulatsel | E21B 43/26 703/2 |
| 10,428,626 B2* | 10/2019 | Durrani | E21B 43/00 |
| 2008/0208782 A1* | 8/2008 | Weiss | E21B 43/16 702/6 |

FOREIGN PATENT DOCUMENTS

| | | | |
|---|---|---|---|
| CN | 102418518 A | * | 4/2012 |
| CN | 103175513 A | | 6/2013 |

(Continued)

OTHER PUBLICATIONS

Data Mining Approaches for Casing Failure Prediction and Prevention (Year: 2019).*

(Continued)

*Primary Examiner* — Ricky Go

(57) ABSTRACT

A real-time abnormity-diagnosing and interpolation method for water regime-monitoring data relates to the technical field of monitoring water regime. This method includes the following steps: acquiring water regime-monitoring data, drawing a box plot, recognizing and diagnosing abnormal data in real time based on the box plot, performing grey correlation analysis on other variables related to a predictor variable, building a BP neural network model and making training, applying the BP neural network model to predict water regime-monitoring data in real time, and performing abnormity diagnosis and data interpolation. Adopting this method, we can effectively enhance predicting and moni- (Continued)

toring the water regime-monitoring data in real time, and diagnose abnormal data and make interpolations in time, thereby improving the reliability of data, objectively reflecting water regime changes, and effectively guiding engineering scheduling.

8 Claims, 3 Drawing Sheets

(56) References Cited

FOREIGN PATENT DOCUMENTS

| | | |
|---|---|---|
| CN | 106355540 A | 1/2017 |
| CN | 108596507 A | 9/2018 |
| CN | 109615124 A | 4/2019 |
| CN | 109826593 A | 5/2019 |
| CN | 110196456 A | 9/2019 |
| CN | 110530650 A | 12/2019 |
| CN | 111307123 A | 6/2020 |
| WO | 2018092238 A1 | 5/2018 |

OTHER PUBLICATIONS

Neural Networks for Field-Wise Waterflood Management in Low Permeability, Fractured Oil Reservoirs (Year: 1996).*
Dividing Oil Fields into Regions with Similar Characteristic Behavior Using Neural Network and Fuzzy Logic Approaches (Year: 1996).*
International Search Report of PCT/CN2021/080037.
Written Opinion of PCT/CN2021/080037.

* cited by examiner

REAL-TIME ABNORMITY-DIAGNOSING AND INTERPOLATION METHOD FOR WATER REGIME-MONITORING DATA

CROSS-REFERENCE TO RELATED APPLICATIONS

This application is a national stage application of PCT/CN2021/080037. This application claims priorities from PCT Application No. PCT/CN2021/080037, filed Mar. 10, 2021, and from the Chinese patent application 202010256036.1 filed Apr. 2, 2020, the content of which are incorporated herein in the entirety by reference.

FIELD OF THE INVENTION

The present invention relates to the technical field of monitoring water regime, in particular to a real-time abnormity-diagnosing and interpolation method for water regime-monitoring data.

BACKGROUND OF THE INVENTION

Comprehensive monitoring systems covering water level, flow, velocity and other water regime elements have been formed for some completed open canal engineering, with the widespread application of various monitoring equipment in the water conservancy system. However, due to various factors such as equipment failure, transmission interruption, human disturbance, environmental changes, etc., abnormal values (including unmonitored missing values) are prone to occur in monitoring data, directly leading to a decrease in the quality of monitoring data, thereby affecting scheduling decisions. Therefore, it has important application value and scientific significance to identify abnormal data in time and use reasonable data to interpolate and correct it, for improving the reliability of data, objectively reflecting changes in water regimes, and effectively guiding engineering scheduling.

The method of diagnosing abnormal data by means of rules often contains larger subjective factors, thus has a problem of inconsistent diagnostic criterias. Numerical methods such as traditional Lagrangian interpolation and Newton interpolation are more suitable for data interpolation, but have a great restriction in the application of monitoring the real-time interpolation of data due to high completeness requirements for the data within the front and back time intervals of the missing value (an unmonitored missing values and an excluded abnormal value). Therefore, it is a key problem to be solved for the water-regime monitoring in open canal engineering to rapidly and effectively identify abnormal data and interpolate it with reasonable data in real time.

Therefore, it is urgent to find a method of predicting and controlling water level to solve the above technical problems.

SUMMARY OF THE INVENTION

The objective of the present invention is to provide a real-time abnormity-diagnosing and interpolation method for water regime-monitoring data, so as to solve the aforementioned problems in the prior art.

To achieve the above object, the present invention adopts the following technical solution:

A real-time abnormity-diagnosing and interpolation method for water regime-monitoring data, comprising the following steps:

S1: acquiring water regime-monitoring data, drawing a box plot, recognizing and diagnosing abnormal data in real time based on the box plot;

S2: performing grey correlation analysis on other variables related to a predictor variable;

S3: building a BP neural network model and making training, with the high-correlation variable compared and selected by the grey correlation analysis as an input to the model, and the predictor variable as an output from the model;

S4: applying the BP neural network model to real-time prediction.

Preferably, S1 specifically includes: selecting the water-regime monitoring data continued for two days as 2-hour water-regime monitoring data to draw a box plot, depicting the discrete distribution of said data, adopting the quartile and interquartile range of discrete data as a criteria to judge an abnormal value, so as to identify the abnormal value in the monitoring data.

Preferably, said criteria to judge an abnormal value is specifically: taking data less than $Q_1-1.5QR$ or greater than $Q_3+1.5QR$ as the criteria to judge abnormal data, where $Q_1$ is the first quartile, $Q_3$ is the third quartile, and QR is the interquartile range, with $QR=Q_3-Q$.

Preferably, S2 specifically includes:

S21, according to the nature and characteristics of the predictor variable, selecting other variables that can influence and reflect the predictor variable, and performing the gray correlation analysis;

S22: nondimensionalizing the selected variables for grey relational analysis, making the variables with different physical meanings and different data dimensions easy to be compared with each other;

S23: calculating gray correlation coefficients $\xi$ representing the difference between each relevant variable and the predictor variable at a certain moment, of each relevant variable, and simplifying them into Formula (1):

$$\xi_{0i} = \frac{\Delta(\min) + \rho\Delta(\max)}{\Delta_{0i}(k) + \rho\Delta(\max)} \quad (1)$$

wherein $\xi_{0i}$ is a correlation coefficient; $\rho$ is a resolution coefficient, generally between 0 and 1, usually 0.5; $\Delta(\min)$ is a second-level minimum difference, $\Delta(\max)$ is a second-level maximum difference; $\Delta_{0i}(k)$ is an absolute difference between each point on each comparison sequence and each point on a reference sequence curve;

S24: calculating the correlation degree of each relevant variable, and concentrating the correlation coefficients at each moment into one value as Formula (2), $$r_i = \frac{1}{N}\sum_{k=1}^{N}\xi_i(k) \quad (2)$$

wherein $r_i$ is a gray correlation degree of the comparison sequence to the reference sequence, and $\xi_i$ is a correlation coefficient calculated in S3;

S25: sequencing the correlation degree of each relevant variable to the predictor variable, reflecting the correlation size between each relevant variable and the predictor variable.

Preferably, said predictor variables refer to real-time water regime-monitoring data, including the water level and flow of check-gates.

Preferably, the nondimensionalizing process in S22 specifically includes:

selecting a standardization method, performing a linear transformation on the original data of selected variables, defining minA and maxA as the minimum and maximum values of a variable A, respectively, and mapping an original value x of A into a value x' which is the dimensionless result of the original value x, within the interval [0,1] through min-max standardization.

Preferably, in S3, the high correlation variable in the BP neural network model is the variable with the largest correlation coefficient.

Preferably, the BP neural network model is built in S3 by:

using past monitoring data of the high correlation variable as an input to the model, and past monitoring data of the predictor variable as an output from the model, adopting a Matlab neural network toolbox to build an error backpropagation-information feedforward neural network model, and making training on the built network model;

trained data should contain at least 2-hours data with high-correlation variable and through one-year time span.

Preferably, the 2-hour time-sequencing data of water regime-monitoring data in S1 are used as an input to the BP neural network model, and applied to the BP neural network model having completed training in S3, the output predictor variable value is the correction value of the real-time abnormal value.

The beneficial effects of the present invention are as follows:

The present invention has disclosed a real-time abnormity-diagnosing and interpolation method for water regime-monitoring data, in which we can acquire water regime-monitoring data, draw a box plot, recognize and diagnose abnormal data in real time based on the box plot, perform grey correlation analysis on other variables related to a predictor variable, build a BP neural network model and make training, apply the BP neural network model to predict water regime-monitoring data in real time, and perform abnormity diagnosis and data interpolation. Adopting this method, we can effectively enhance predicting and monitoring the water regime-monitoring data in real time, and diagnose abnormal data and make interpolations in time, thereby improving the reliability of data, objectively reflecting water regime changes, and effectively guiding engineering scheduling.

DETAILED DESCRIPTION OF SOME EMBODIMENTS

Figure 1:
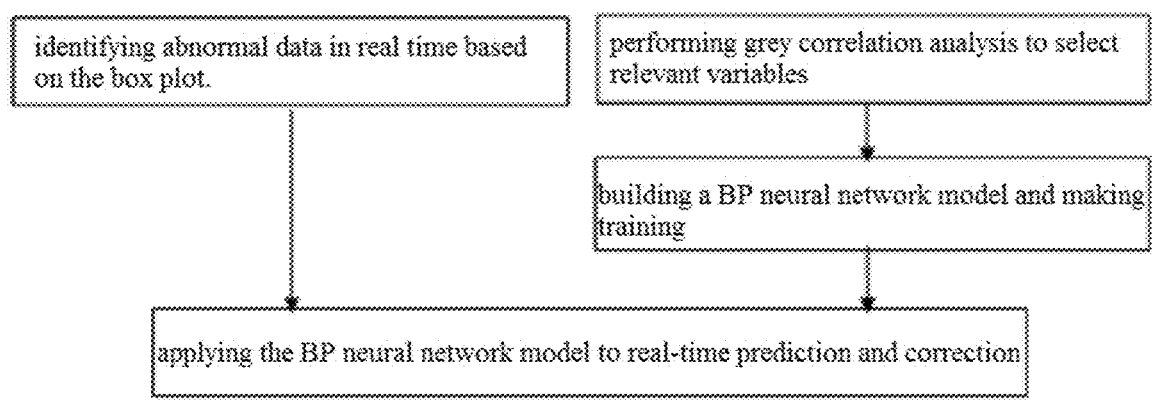
FIG. 1 is a schematic flow chart of the real-time abnormity-diagnosing and interpolation method for water regime-monitoring data in Example 1.

In order to make the objectives, technical solutions, and advantages of the present invention clearer, the present invention will be further described in detail in combination with the drawings as follows. It should be understood that the specific embodiments described herein are only used to explain the present invention, but not used to impose limitations on the present invention.

Example 1

The present invention provides a real-time abnormity-diagnosing and interpolation method for water regime-monitoring data, which specifically includes the following steps.

Step 1: Identifying and Diagnosing Abnormal Data in Real Time Based on the Box Plot Analysis Method.

The collection frequency of monitoring data in open canal engineering can be accurate to second-level, while the second-level monitoring data are interfered by the real-time fluctuation of the water regime data of open canal engineering, which is not conducive to guiding the project scheduling. The water-regime monitoring frequency of open canal engineering is not as high as possible, under the influence of various factors such as the hydraulic characteristics of the river in open canal engineering, the operation period of engineering, and the labor intensity of personnel. During an actual scheduling, 2-hour water-regime monitoring data has high stability and good continuity, and can objectively reflect water regime changes and effectively guide project scheduling. Therefore, the 2-hour water-regime monitoring data is selected to draw a box plot to identify and diagnose abnormal data in real time.

In order to avoid affecting identifying and diagnosing abnormal values in real time due to a wide data distribution range, the water-regime monitoring data selected to draw the box plot should not be too much, neither the duration too long. In this example, 2-hour water-regime monitoring data continued for two days are selected to draw a box plot to depict the discrete distribution of data, and the quartile and interquartile range are adopted as a criteria to judge the abnormal value, which in the data can be visually identified. Furthermore, the shape of the box plot reflects the skewness and data quality, and the skewness indicates the degree of deviation. The heavier end portion indicating more abnormal values, the worse the data quality.

Step 2: Performing Grey Correlation Analysis on Other Variables Related to a Predictor Variable.

(1), according to the nature and characteristics of the predictor variable, selecting other variables that can influence and reflect the predictor variable, and performing the gray correlation analysis;

(2), nondimensionalizing the selected variables for grey relational analysis, making the variables with different physical meanings and different data dimensions easy to be compared with each other;

(3), calculating gray correlation coefficients representing the difference between each relevant variable and the predictor variable at a certain moment, of each relevant variable, and simplifying them into Formula (1):

$$\xi_{0i} = \frac{\Delta(\min) + \rho\Delta(\max)}{\Delta_{0i}(k) + \rho\Delta(\max)} \quad (1)$$

wherein $\xi_{0i}$ is a correlation coefficient; $\rho$ is a resolution coefficient, generally between 0 and 1, usually 0.5; $\Delta(\min)$ is a second-level minimum difference, $\Delta(\max)$ is a second-level maximum difference; $\Delta_{0i}(k)$ is an absolute difference between each point on each comparison sequence and each point on a reference sequence curve;

(4), calculating the correlation degree of each relevant variable, and concentrating the correlation coefficients at each moment into one value as Formula (2), $$r_i = \frac{1}{N}\sum_{k=1}^{N}\xi_i(k) \quad (2)$$

wherein $r_i$ is a gray correlation degree of the comparison sequence to the reference sequence, and $\xi_i$ is a correlation coefficient calculated in S3;

(5), sequencing the correlation degree sequencing the correlation degree of each relevant variable to the predictor variable, reflecting the correlation size between each relevant variable and the predictor variable.

Step 3: Building a BP Neural Network Model and Making Training, with the High-Correlation Variable Compared and Selected by the Grey Correlation Analysis as an Input to the Model, and the Predictor Variable as an Output from the Model.

Through the error backpropagation-information feedforward neural network model, the BP neural network is built with training. During the actual scheduling of open canal engineering, 2-hour water-regime monitoring data has high stability and good continuity, and can objectively reflect water regime changes and effectively guide project scheduling. Furthermore, Due to the obvious annual periodicity in the scheduling plan of canal engineering, trained data should contain at least 2-hours data with high-correlation variable and through one-year time span, at selecting data for training.

A training method of BP network models pertains to the existing technology, so it will not be repeated herein.

Step 4: Applying the BP Neural Network Model to Real-Time Prediction.

When the abnormal value in the water-regime monitoring data of open canal engineering has been identified and diagnosed by means of the box plot method in Step 1, the 2-hour time-sequencing data of the relevant variables are used as an input to the BP neural network model trained in Step 3, from which an output is the predictor variable, that is, the correction value of the real-time abnormal value. The abnormal data is predicted and corrected in real time by means of the BP network model, with an improvement to data quality and a reflection of a real water regime in real time.

Example 2

This Example adopts a specific embodiment, taking the middle route of the South-to-North Water Transfer Project as an example, and according to the method described in Example 1, a real-time abnormity-diagnose and interpolation is performed on water regime-monitoring data.

The middle route of the South-to-North Water Diversion Project has a total length of 1432 kilometers, an average water transfer volume of 9.5 billion cubic meters based a plurality of years, and 97 diversions, and is connected with 293 water plants, as a main artery and lifeline connecting Danjiangkou Reservoir with Beijing, Tianjin, Hebei, and Henan. The whole line is mainly based on open canal engineering, with changeable operation conditions, difficult joint adjustments, many scheduling target and small error tolerance. It has important application value and scientific significance to identify abnormal data in time and use reasonable data to interpolate and correct it, for improving the reliability of data, objectively reflecting changes in water regimes, and effectively guiding engineering scheduling.

Figure 2:
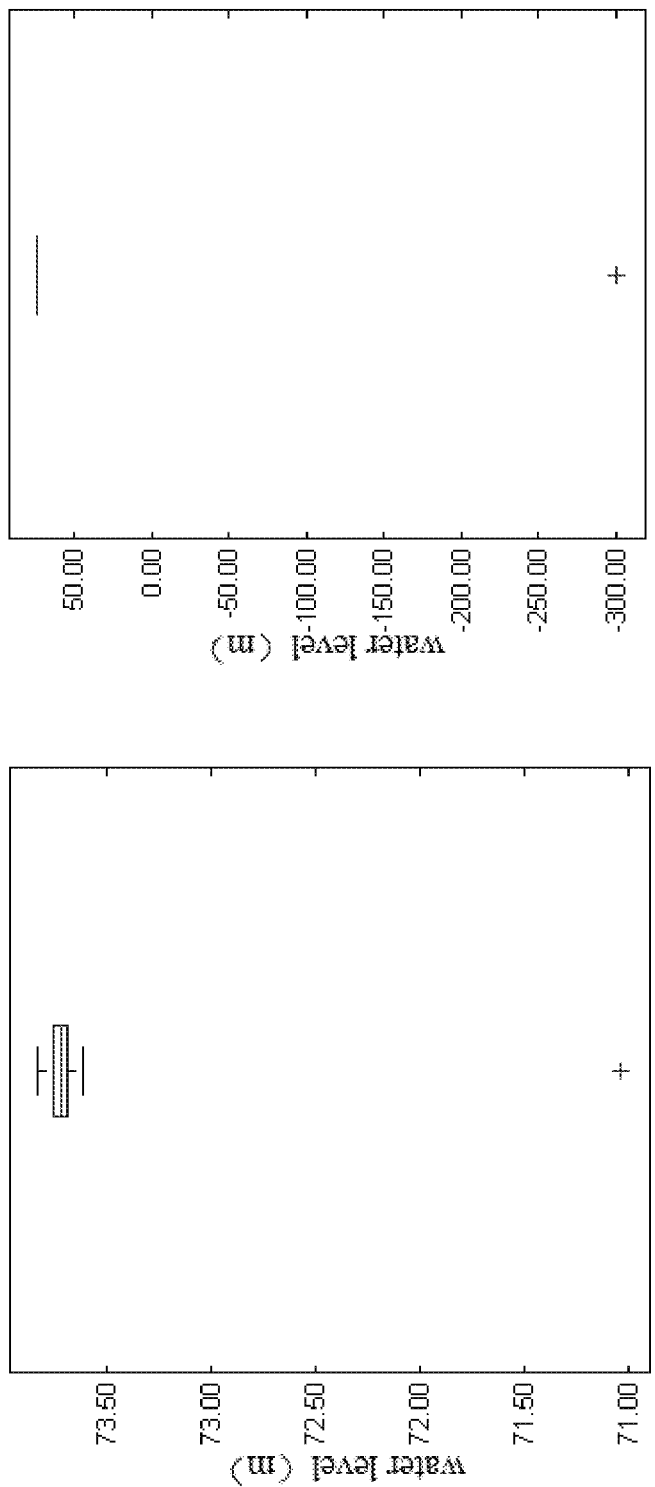
FIG. 2 is the result of the box plot derived from identifying and diagnosing the abnormal value of the water level data at the check-gate in Example 2.

The water-regime monitoring frequency of open canal engineering is mostly 2 hours, under the influence of various factors such as the hydraulic characteristics of the river in open canal engineering, the operation period of engineering, and the labor intensity of personnel. The monitoring data selected for the study are the water level data monitored for 2 hours in front of Gate 1# of the Cihe inverted siphon check-gate, and the study period is from 0:00 on Mar. 1, 2018 to 24:00 on Jul. 31, 2018. The water level monitoring data collected every 2 days in front of the gate are depicted into a box plot to identify and diagnose abnormal data in real time. The simulation results are shown in FIG. 2.

other variables that can reflect the current water level in front of the check-gate or influence it are selected to perform grey correlation analysis. The relevant variables selected for study include the flow data of the upstream check-gate, the water level in front of the current check-gate, the water level behind the current check-gate, the gate opening of the current check-gate, the upstream water diversion flow data and the like. The analysis results are shown in Table 1:

TABLE 1 grey correlation analysis results of the water level in front of the current check-gate

| relevant variables | correlation degree |
| --- | --- |
| the flow data of the upstream check-gate | 0.715964 |
| the water level in front of the current check-gate | 0.999833 |
| the water level behind the current check-gate | 0.993994 |
| the gate opening of the current check-gate | 0.637742 |
| the upstream water diversion flow data | 0.675155 |

Figure 3:
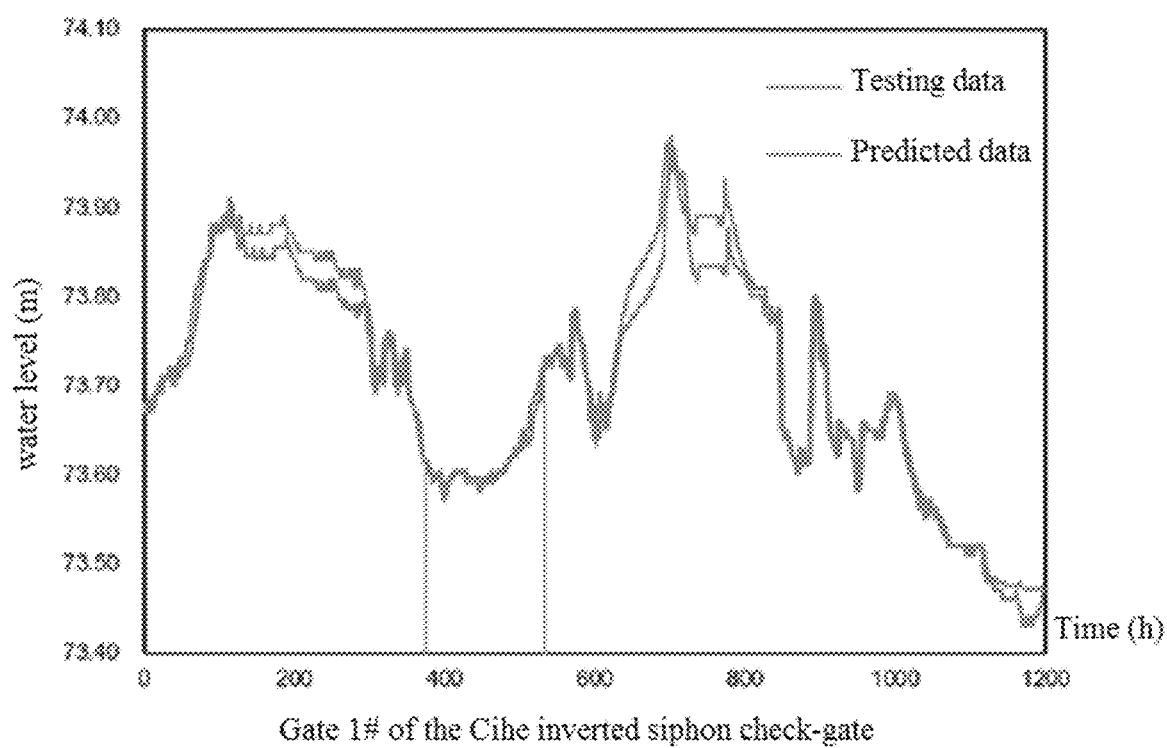
FIG. 3 is the result of the abnormal value accruing in the water level data of the check-gate after making interpolations to the water level in front of the check-gate adopting the BP neural network model in Example 2.

The analysis results show that the water level in front of and behind the check-gate has the strongest correlation with the predictor variable, so they are selected as an input to build a BP neural network model. In open canal engineering, the water regime is monitored mostly in frequency of 2 hours, and the scheduling command has annual periodicity. Therefore, the water level data collected in front of and behind the gate during one-year time span are selected for model training, and the water levels in front of the current check-gate are predicted with the simulation results shown in FIG. 3.

By adopting the above-mentioned technical solution disclosed by the present invention, the following beneficial effects are obtained:

The present invention discloses a real-time abnormity-diagnosing and interpolation method for water regime-monitoring data, by which we can acquire water regime-monitoring data, draw a box plot, recognize and diagnose abnormal data in real time based on the box plot, perform grey correlation analysis on other variables related to a predictor variable, build a BP neural network model and make training, apply the BP neural network model to predict water regime-monitoring data in real time, and perform abnormity diagnosis and data interpolation. Adopting this method, we can effectively enhance predicting and monitoring the water regime-monitoring data in real time, and diagnose abnormal data and make interpolations in time, thereby improving the reliability of data, objectively reflecting water regime changes, and effectively guiding engineering scheduling.

The above are only the preferred embodiments of the present invention. It should be pointed out that a person skilled in the art can make several improvements and modifications without departing from the principle of the present invention, and these improvements and modifications should also be regarded as the protection scope of the present invention.

What is claimed is:

1. A real-time abnormity-diagnosing and interpolation method, executed by a processor, for water regime-monitoring data, comprising the following steps:
    S1: acquiring water regime-monitoring data, drawing a box plot, recognizing and diagnosing abnormal data in real time based on the box plot;
    S2: performing grey correlation analysis on other variables related to a predictor variable;
    S3: building a BP neural network model in a neural processing unit (NPU) of a device and making training, with the high-correlation variable compared and selected by the grey correlation analysis as an input to the model, and the predictor variable as an output from the model;
    S4: applying the BP neural network model in the neural processing unit (NPU) of the device to predict water regime-monitoring data in real time, and performing abnormity diagnosis and data interpolation, thereby improving reliability of water regime-monitoring data, objectively reflecting changes in water regimes, and effectively guiding engineering scheduling, and predicting and controlling water level to solve problem of water-regime monitoring in open canal engineering to rapidly and effectively identify the abnormal data and interpolate the abnormal data with normal data in real time,
    wherein S2 specifically includes:
    S21, according to the nature and characteristics of the predictor variable, selecting other variables that can influence and reflect the predictor variable, and performing the gray correlation analysis;
    S22: nondimensionalizing the selected variables for grey relational analysis, making the variables with different physical meanings and different data dimensions easy to be compared with each other;
    S23: calculating gray correlation coefficients $\xi$ representing the difference between each relevant variable and the predictor variable at a certain moment, of each relevant variable, and simplifying them into Formula (1):

$$\xi_{0i} = \frac{\Delta(\min) + \rho\Delta(\max)}{\Delta_{0i}(k) + \rho\Delta(\max)} \quad (1)$$

wherein $\xi_{0i}$ is a correlation coefficient; $\rho$ is a resolution coefficient, generally between 0 and 1, usually 0.5; $\Delta(\min)$ is a second-level minimum difference, $\Delta(\max)$ is a second-level maximum difference; $\Delta_{0i}(k)$ is an absolute difference between each point on each comparison sequence and each point on a reference sequence curve;

S24: calculating the correlation degree of each relevant variable, and concentrating the correlation coefficients at each moment into one value as Formula (2), $$r_i = \frac{1}{N}\sum_{k=1}^{N}\xi_i(k) \quad (2)$$

wherein $r_i$ is a gray correlation degree of the comparison sequence to the reference sequence, and $\xi_i$ is a correlation coefficient calculated in S3;

S25: sequencing the correlation degree of each relevant variable to the predictor variable, reflecting the correlation size between each relevant variable and the predictor variable.

2. The real-time abnormity-diagnosing and interpolation method for water regime-monitoring data according to claim 1, wherein S1 specifically includes: selecting the water-regime monitoring data continued for two days as 2-hour water-regime monitoring data to draw a box plot, depicting the discrete distribution of said data, adopting the quartile and interquartile range of discrete data as a criteria to judge an abnormal value, so as to identify the abnormal value in the monitoring data.

3. The real-time abnormity-diagnosing and interpolation method for water regime-monitoring data according to claim 1, wherein said criteria to judge an abnormal value is specifically: taking data less than $Q_1-1.5QR$ or greater than $Q_3+1.5QR$ as the criteria to judge abnormal data, where $Q_1$ is the first quartile, $Q_3$ is the third quartile, and QR is the interquartile range, with $QR=Q_3-Q$.

4. The real-time abnormity-diagnosing and interpolation method for water regime-monitoring data according to claim 1, wherein said predictor variables refer to real-time water regime-monitoring data, including the water level and flow of check-gates.

5. The real-time abnormity-diagnosing and interpolation method for water regime-monitoring data according to claim 1, wherein the nondimensionalizing process in S22 specifically includes:
    selecting a standardization method, performing a linear transformation on the original data of selected variables, defining minA and maxA as the minimum and maximum values of a variable A, respectively, and mapping an original value x of A into a value x' which is the dimensionless result of the original value x, within the interval [0,1] through min-max standardization.

6. The real-time abnormity-diagnosing and interpolation method for water regime-monitoring data according to claim 1, wherein in S3, the high correlation variable in the BP neural network model in the neural processing unit (NPU) of the device is the variable with the largest correlation coefficient.

7. The real-time abnormity-diagnosing and interpolation method for water regime-monitoring data according to claim 1, wherein the BP neural network model in the neural processing unit (NPU) of the device is built in S3 by:

using past monitoring data of the high correlation variable as an input to the model, and past monitoring data of the predictor variable as an output from the model, adopting a Matlab neural network toolbox to build an error backpropagation-information feedforward neural network model, and making training on the built network model;

trained data should contain at least 2-hours data with high-correlation variable and through one-year time span.

8. The real-time abnormity-diagnosing and interpolation method for water regime-monitoring data according to claim 1, wherein the 2-hour time-sequencing data of water regime-monitoring data in S1 are used as an input to the BP neural network model in the neural processing unit (NPU) of the device, and applied to the BP neural network model in the neural processing unit (NPU) of the device having completed training in S3, the output predictor variable value is the correction value of the real-time abnormal value.

* * * * *